Norikazu Sawazaki
Tsutomu Honma
Motoi Yagi
INVENTORS

BY George B. Oujevolk
Attorney

Nov. 14, 1967 NORIKAZU SAWAZAKI ET AL 3,352,966

TELEVISION TELEPHONE SYSTEM UTILIZING ONE TELEPHONE LINE

Filed April 27, 1964 3 Sheets-Sheet 3

United States Patent Office 3,352,966
Patented Nov. 14, 1967

3,352,966
TELEVISION TELEPHONE SYSTEM UTILIZING ONE TELEPHONE LINE

Norikazu Sawazaki, Yokohama-shi, Tsutomu Honma, Kawasaki-shi, and Motoi Yagi, Zushi-shi, Japan, assignors to Tokyo Shibaura Electric Co., Ltd., Kawasaki-shi, Japan, a corporation of Japan Filed Apr. 27, 1964, Ser. No. 362,621
Claims priority, application Japan, Apr. 30, 1963, 38/22,866, 38/22,867
1 Claim. (Cl. 178—6)

The present invention relates to a television telephone system wherein voice signals can be transmitted while picture signals also can be successively transmitted over the same telephone line.

In the past television telephone systems have been devised to transmit voice signals together with picture signals at the same time. Accordingly, it is essential to tranmit picture signals over telephone lines. For example at the transmitting terminal, picture signals are made to be commensurate with the band width of a carrier frequency wave utilized in telephone lines by using a suitable band compressing means such as for example by writing picture signals in a magnetic drum which is then rotated at a low frequency to read out stored signals and send them out over telephone lines. At the receiving terminal, the received picture signals which are read out at a low speed are reproduced as visible images through the use of a suitable accumulator device, such as an accumulator tube. As a result it is impossible to transmit speech signals over telephone lines which are utilized to transmit picture signals. Moreover as the picture signals are to be transmitted in both directions between subscribers, two telephone lines are required to transmit the picture images alone, and three telephone lines are required for a whole television telephone system. This is the most serious problem that hinders wide use of this system.

The principal object of this invention is to provide a novel television telephone system which can be used widely and can be manipulated easily.

While the invention concludes with claims particularly pointing out and distinctly claiming the subject matter which are regarded as the invention, it is believed that the invention will be better understood from the following description taken in connection with the accompanying drawings, in which:

FIG. 3 illustrates examples of operating time charts wherein FIG. 3A shows a state of using telephone lines, FIGS. 3B and 3C show the state of displaying picture images between subscribers.

Figure 1:
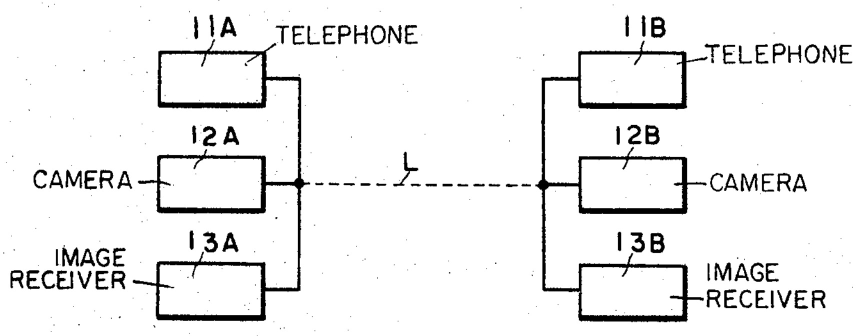
FIG. 1 is a block diagram to explain the principle of this invention.

Referring now to FIG. 1 it is assumed that television speech is to be made between two subscribers A and B, which are connected together by a telephone line L. At each terminal of the telephone line are connected in parallel voice speech telephones 11A, 11B, image transmitting cameras 12A and 12B and image receivers 13A and 13B, respectively.

Figure 2:
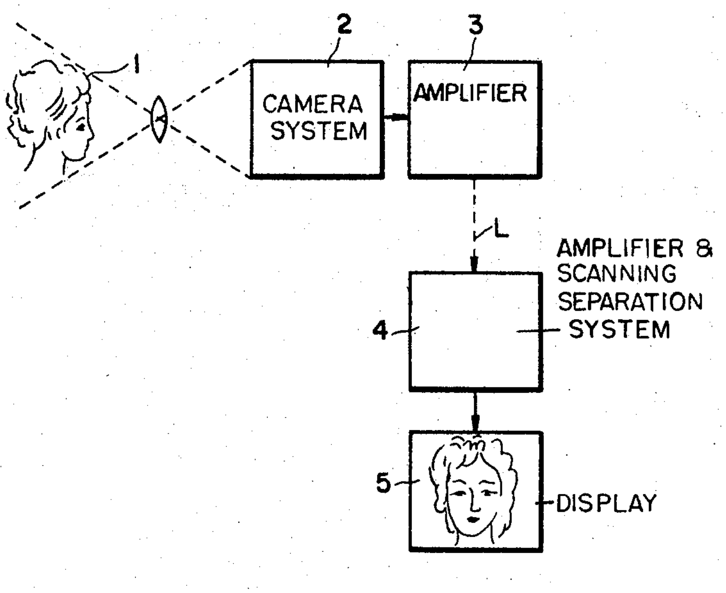
FIG. 2 shows a block diagram to illustrate a transmitting means of picture images.

In this case telephones 11A and 11B may be any conventional telephones presently used so that only the image transmitting and receiving system or a system comprising cameras 12A, 12B and image receiving devices 13A and 13B will be described by referring to FIG. 2. Thus, the picture image of an object 1 to be transmitted is received by a photoelectric conversion camera system 2 comprising a scanning system including an optical system, a photoelectric conversion system, an amplifier system and a synchronizing system, said photoelectric conversion system of scanning system employing low speed scanning vidicon cameras and the like, for example. If a shutter is mounted in front of a camera lens so as to expose a photoelectric surface to the light input for only a very short time an image of substantially quiescent frame can be obtained even for a moving object. Synchronism of this image of one frame can be done by using 50 cycles for horizontal and 2 to 8 seconds for vertical by taking into consideration the frequency characteristics of the telephone line. The output signals from the photoelectric conversion camera system 2 are amplified by an amplifier 3 and then transmitted to the receiving terminal over the telephone line L. In other words, the image of the object 1 is wholly transmitted to the receiving and during one vertical scanning by means of the photoelectric conversion camera system 2. At the receiving terminal signals transmitted over the telephone line L are received by a combined amplifier and scanning separation system 4 to be displayed on a displaying system 5 of the received pictures. As the displaying system, any suitable means such as an electrostatic recording means or a magnetic recording means may be utilized to directly display on a recording element the input signals as visible images, after they have been amplified. Thus the displaying system will display a quiescent image of a person or a figure, i.e. the object 1 situated at the transmitting terminal and the displayed image will persist semipermanently unless a particular erasing operation is made. Subscribers can both speak while viewing these displayed images, thus enabling good understanding while viewing the face or figure at the opposite terminal.

The operation of the television telephone system of the type referred to above can be tabulated as follows:

TABLE

| Type of operation | Subscriber A | (Signals transmitted) | Subscriber B |
|---|---|---|---|
| Speech | Telephone | ⟶ (Voice) ⟶ / ⟵ ⟵ | Telephone. |
| Transmission of image: | | | |
| A⟶B | Camera | ⟶ (Image) ⟶ | Image receiver. |
| B⟶A | Image receiver | ⟵ (Image) ⟵ | Camera. |

Figure 3:
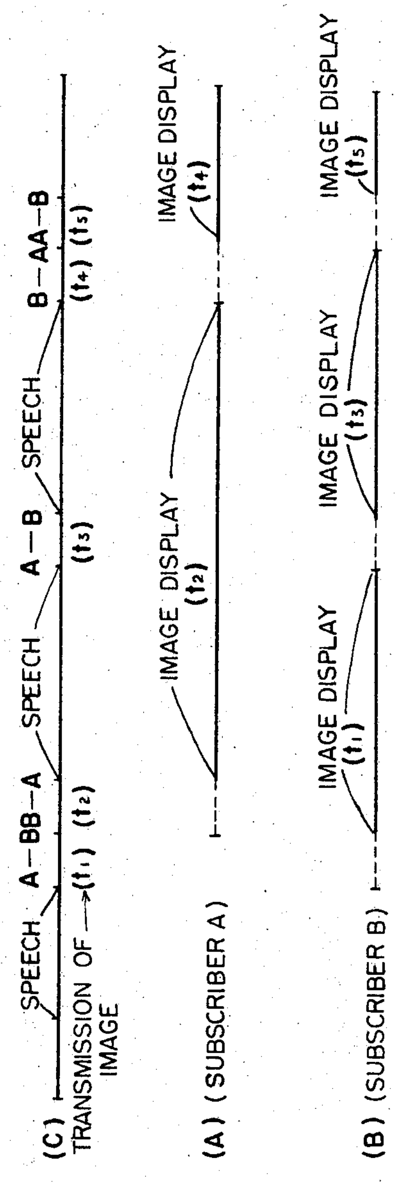

According to this invention transmission and reception of the image can be made between subscribers A and B whenever they wish. For example as shown in FIG. 3A, speech is momentarily interrupted to transmit the image. FIG. 3C illustrates an example of an operating time system showing a condition of utilization of a telephone line C. FIGS. 3A and 3B show the operating time systems of subscribers A and B, respectively. In these figures, images transmitted at $t_1$, $t_2$, $t_3$ $t_4$ and $t_5$ in FIG. 3C appear therein in the corresponding sections designated by the same reference letters. In FIGS. 3A and 3B sections represented by solid lines represent the sections in which images are actually displayed whereas in section represented by dotted lines images are transmitted.

Figure 4:
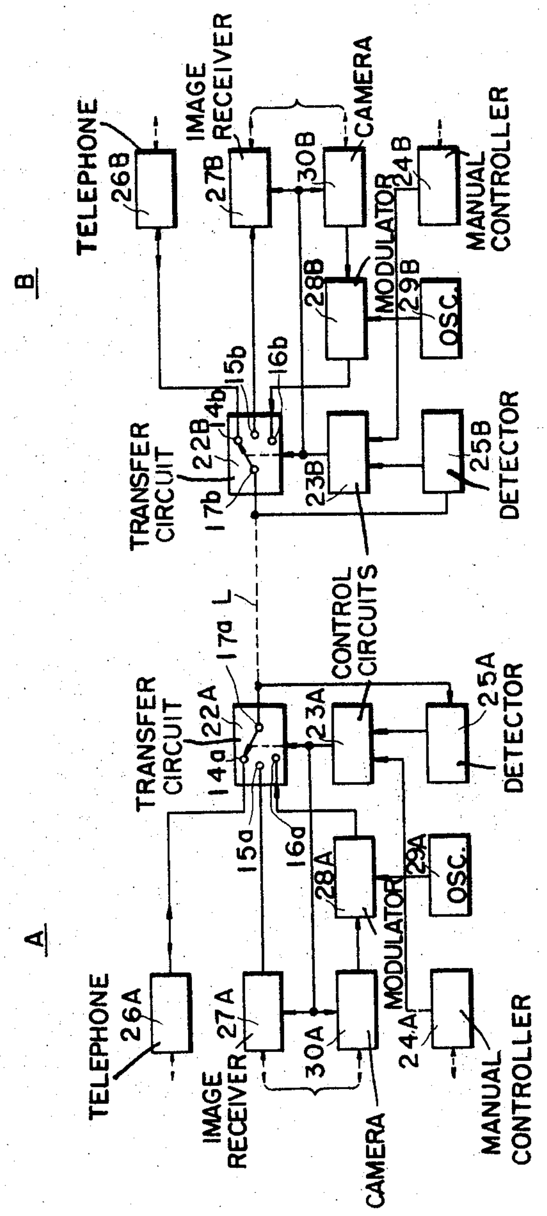
FIG. 4 illustrates a block diagram of one embodiment of this invention.

FIG. 4 illustrates a block diagram of one embodiment of this invention wherein subscribers A and B are interconnected by a telephone line L. Referring first to the terminal at the subscriber A, the telephone line L is connected to a response terminal 17*a* of a transfer circuit 22A including three contacts 14*a*, 15*a* and 16*a*, said response terminal 17*a* being normally connected to the contact 14*a*. The transfer operation of the transfer circuit 22A is controlled by a control circuit 23A which responds to commands coming from a manual controller 24A adapted to control transmission of images and from a carrier wave detector circuit for the telephone line L. The contact 14*a* of the transfer circuit 22A is connected to a telephone 26A for speech communication, whereas contacts 15*a* and 16*a* are connected respectively to an image receiver 27A and an output terminal of a modulator 28A. The modulator acts to modulate a carrier frequency from a carrier wave oscillator 29A by means of image signals supplied by a camera 30A. The image receiver as well as the camera 30A respectively forms and takes optical images and have their operation controlled by said control circuit 23A.

At the terminal of the subscriber B there are provided identical component parts designated by the same reference letters with suffix B. As the apparatus at the subscriber B operates in the same manner as that of the subscriber A it is believed unnecessary to describe it.

Turning now to the operation of the television telephone system shown in FIG. 4, as mentioned herein before the transfer circuits 22A and 22B operates to normally connect telephones 26A and 26B to the telephone line L. Thus when subscribers A and B are interconnected through a conventional telephone exchange, normal speech condition will be established. Under this condition when the subscriber A operates the manual controller 24A to transmit images to the subscriber B, the control circuit 23A will operate the transfer circuit 22A to switch its response terminal 17*a* to the contact 16*a*. Concurrently therewith the camera 30A is operated and the image signals produced thereby modulate a carrier wave of 2.5 kc., for example, produced by the carrier wave oscillator 29A to send out the modulated wave on to the telephone line L.

Image signals modulated and sent out in a manner as above described will be transmitted to the terminal of the subscriber B, and detected therein by the carrier current detector circuit 25B to actuate the control circuit 23B so as to switch the response terminal 17*b* to the contact 15*b*. At the same time the control circuit 23B will start the image receiver 27B. Thus images which are sent from the camera 30A at the subscriber A through the telephone line L will be displayed by the receiver at the subscriber B. If, at this time, it is assumed that the subscriber B had operated the manual controller 24B to control transmission of images, the output of the controller 24B would also be supplied to the control circuit 23B. If the carrier wave from the subscriber A has reached a short time earlier than this the control circuit will have a preference to receive images and to stop the operation of the camera 30B. Upon completion of the transmission of images and hence the carrier wave transmitting them from the subscriber A, the control circuit 23B will be operated, to permit the camera 30B to operate while at the same time to switch the response terminal 17*b* of the transfer switch to the contact 16*b* thus initiating transmission of images to the subscriber A. When transmission of images between subscribers has been completed and hence the carrier wave disappears transfer circuits 22A and 22B will complete a speech circuit between telephones 26A and 26B under a control of control circuits 23A and 23B thus establishing a condition of mutual speech communication.

Thus, when the manual controller 24A or 24B is operated to transmit images each of the subscribers can transmit and receive images so long as a speech circuit is being established between subscribers A and B.

Vidicon cameras having low scanning speed, cameras including photoelectric conversion systems by means of mechanical scanning and the like are suitable to be used as cameras 30A and 30B. It is to be understood that these cameras operate to convert a static picture image of one frame into an image signal having a band compressed by the low speed scanning. As the receiver 27A and 27B, use may be made of receivers which display the received images as quiescent images, such as an electrostatic device, direct visible type storage tube or means which operates to store images magnetically at a low speed and repeatedly reproduces them at a high speed to display on a fluorescent tube.

Although not shown in the drawing, if the system is controlled such that the receiver at each terminal equipment is operated to respond to the image transmitted from its own terminal so as to act as a monitor it is able to visually confirm the condition of images at its own terminal. While in the drawing, when it is intended to transmit or receive images, telephone circuit is shown to be interrupted under the control of transfer circuits it should be understood that this invention can also be carried out by connecting image transmitting and receiving devices in parallel with the telephone line through magnetic couplings and the like under the control of transfer circuits, without interrupting the telephone line. By this means, without modifying existing telephone circuits, it is possible to add image transmitting and receiving devices embodying this invention and to detect the conditions of image transmission and reception by the telephone receiver.

To illustrate an example of numerical data of the image transmissible over telephone lines and of the transmission time, for transmitting a picture image, utilizing 100 scanning lines and including 80 picture elements per one scanning line, or a picture comprised by picture elements $N=8\times10^3$, an image band F of about 2 kc. will be obtained by transmitting residual lower side band wave of a carrier wave having a frequency of 2.5 kc. Accordingly the transmisison time T can be represented as follows:

$$T=\frac{N}{2F}=2 \text{ seconds}$$

As this represents the time required for transmitting the picture image, interruption of speech for about 4 seconds permits both subscribers to send and receive mutually their picture images.

Thus this invention provides a novel television telephone system by which subscribers can speak with each other while viewing the others' face or drawing and the like, if required, by utilizing a single conventional telephone line.

While the invention has been explained by describing a particular embodiment thereof, it will be apparent that improvements and modifications may be made without departing from the scope of the invention as defined in the appended claim.

What is claimed is:

A television telephone system for sending and receiving both image and speech signals over the same telephone line comprising

- a telephone for communicating speech over a telephone line;
- an image receiver operating to store received image signals magnetically at a low speed and repeatedly reproducing them at a high speed to display on a fluorescent screen of a tube as a quiescent picture;
- an image transmitting means including a camera operating to convert a static picture image of one frame into image signals having the bandwidth compressed by scanning at a low speed, a carrier wave oscillator to oscillate a carrier of a permissible frequency for said telephone line, and a modulator acting to modulate said carrier by the image signals supplied by said camera;

a manual controller adapted to control transmission of the modulated image signals;

a carrier wave detector circuit to detect the received image signals;

a transfer circuit for switching over said telephone line to said telephone, said image receiver and said image transmitting means respectively; and a control circuit to control the transferring operation of said transfer circuit in response to commands coming from said manual controller and from said carrier wave detector circuit.

References Cited

UNITED STATES PATENTS

| | | | |
|---|---|---|---|
| 2,537,173 | 1/1951 | Szegho | 178—6.8 |
| 2,881,251 | 4/1959 | Strip | 179—15 |
| 2,903,517 | 9/1959 | Ridings | 179—4 |
| 2,909,600 | 10/1959 | Becker | 178—6.8 |
| 2,922,843 | 1/1960 | Clark | 178—6.8 |
| 2,974,281 | 3/1961 | Feldman | 179—15 |
| 3,213,200 | 10/1965 | Vogelman | 179—2 |
| 3,263,027 | 7/1966 | Beltrami | 178—6.8 |

JOHN W. CALDWELL, *Primary Examiner.*

DAVID G. REDINBAUGH, *Examiner.*

J. A. ORSINO, *Assistant Examiner.*